United States Patent [19]

Dey et al.

[11] Patent Number: 5,309,375

[45] Date of Patent: May 3, 1994

[54] A METHOD FOR DETERMINING A SURFACE TOPOLOGY OF A WORKPIECE

[75] Inventors: Thomas W. Dey, Springwater; Philip F. Marino, Rochester, both of N.Y.

[73] Assignee: Eastman Kodak Company, Rochester, N.Y.

[21] Appl. No.: 937,816

[22] Filed: Aug. 31, 1992

[51] Int. Cl.$^5$ .............................................. G01B 11/24
[52] U.S. Cl. ........................................ 364/560; 356/2; 356/376; 364/561
[58] Field of Search .................... 356/2, 376; 364/560, 364/561

[56] References Cited

U.S. PATENT DOCUMENTS

Re. 33,774 12/1991 Gurny ............................. 356/376 X
5,067,817 11/1991 Glenn ................................. 356/376

Primary Examiner—Edward R. Cosimano
Attorney, Agent, or Firm—Thomas H. Close

[57] ABSTRACT

A method for determining a surface topology of a workpiece preferably comprising a general symmetric asphere. The method includes the steps of coupling a projectile to a surface of a workpiece, and imparting a trajectory to the projectile with respect to the surface; sensing the trajectory of the projectile with respect to the workpiece surface, for assessing a locus of positional points over time of the projectile, the locus being a measure of the surface topology of the workpiece; and computing from the locus of positional points over time, the surface topology of the workpiece.

3 Claims, 4 Drawing Sheets

A METHOD FOR DETERMINING A SURFACE TOPOLOGY OF A WORKPIECE

FIELD OF THE INVENTION

This invention relates to a method for determining a surface topology of a workpiece.

INTRODUCTION TO THE INVENTION

We are investigating methods suitable for determining a surface topology of a workpiece.

By the phrase, "a surface topology of a workpiece", we mean, preferably, specifying an idealized mathematical expression for a general symmetric asphere e.g., a general conic. For example, a symmetric asphere comprising a paraboloid, may be specified ideally by a mathematical equation (1):

$$Z = \frac{r^2}{2R}. \tag{1}$$

By the phrase, "methods suitable for determining" the surface topology of a workpiece, we mean articulating and evaluating those methods which can ascertain an actual or measured surface topology of the workpiece (as contrasted to its expressed idealized mathematical surface topology), to an end of comparing the actual or measured topology to the idealized topology, thus to deduce a difference of these two parameters as an indication of the quality or figure of merit of the workpiece. This concept can be restated in an equation (2):

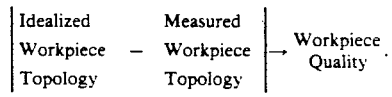

$$\begin{vmatrix} \text{Idealized} \\ \text{Workpiece} \\ \text{Topology} \end{vmatrix} - \begin{vmatrix} \text{Measured} \\ \text{Workpiece} \\ \text{Topology} \end{vmatrix} \rightarrow \text{Workpiece Quality}. \tag{2}$$

SUMMARY OF THE INVENTION

Methods suitable for determining a surface topology of a workpiece, in accordance with equation (2), may be conditioned (inter alia) by a particular type of workpiece under consideration, by a required or desired method accuracy, by expense, and by difficulty in realization of the method.

For example, we preferably require a method suitable for determining a surface topology of a workpiece comprising large precision optical devices, including primary mirrors, one to four meters in diameter, that may be employed in astronomical Ritchey-Chrétien telescopes, and wherein a required surface accuracy is approximately 0.000001 inch.

Methods heretofore employed under such conditions include traditional optical testing methods, like the Foucault knife-edge test, or laser interferometry.

We note that these traditional methods usually require auxiliary nulling mirrors or lenses, in order to realize the stated surface accuracies. However, these nulling mirrors or lenses can be difficult and expensive to build. Moreover, each telescope primary mirror needs its own dedicated test set, and an actual testing procedure may be a difficult one to effect.

In sum, we have found that the cost of a traditional testing methodology routinely exceeds the cost of a mirror to be tested, that the extant methodologies may be difficult to implement, and hence, their continued suitability may be moot.

In response to this situation, we now disclose a novel method suitable for determining a surface topology of a workpiece. The novel method comprises the steps of:

(1) coupling a projectile to a surface of a workpiece, and imparting a trajectory to the projectile with respect to the surface; and (2) sensing the trajectory of the projectile with respect to the workpiece surface for assessing a locus of positional points over time of the projectile, the locus being a measure of the surface topology of the workpiece.

The novel method of the present invention has an important advantage, since it can preserve extant methodological accuracies and precision, for example, determining a hyperboloidal surface accuracy of 0.000001 inch, while eschewing their expense and difficulty of implementation, in favor of an easily and inexpensively configured novel testing procedure and assembly.

In particular, the novel testing assembly comprises:

(1) a projectile;

(2) means for coupling the projectile to a workpiece surface and for imparting an initial momentum to the projectile with respect to the surface; and (3) means for sensing a relative movement of the projectile with respect to the surface, for generating a locus of positional points over time of the projectile as a measure of the surface topology of the workpiece.

BRIEF DESCRIPTION OF THE DRAWING

The invention is illustrated in the accompanying drawing, in which.

Detailed Description of the Invention

Novel Testing Assembly

Figure 1:
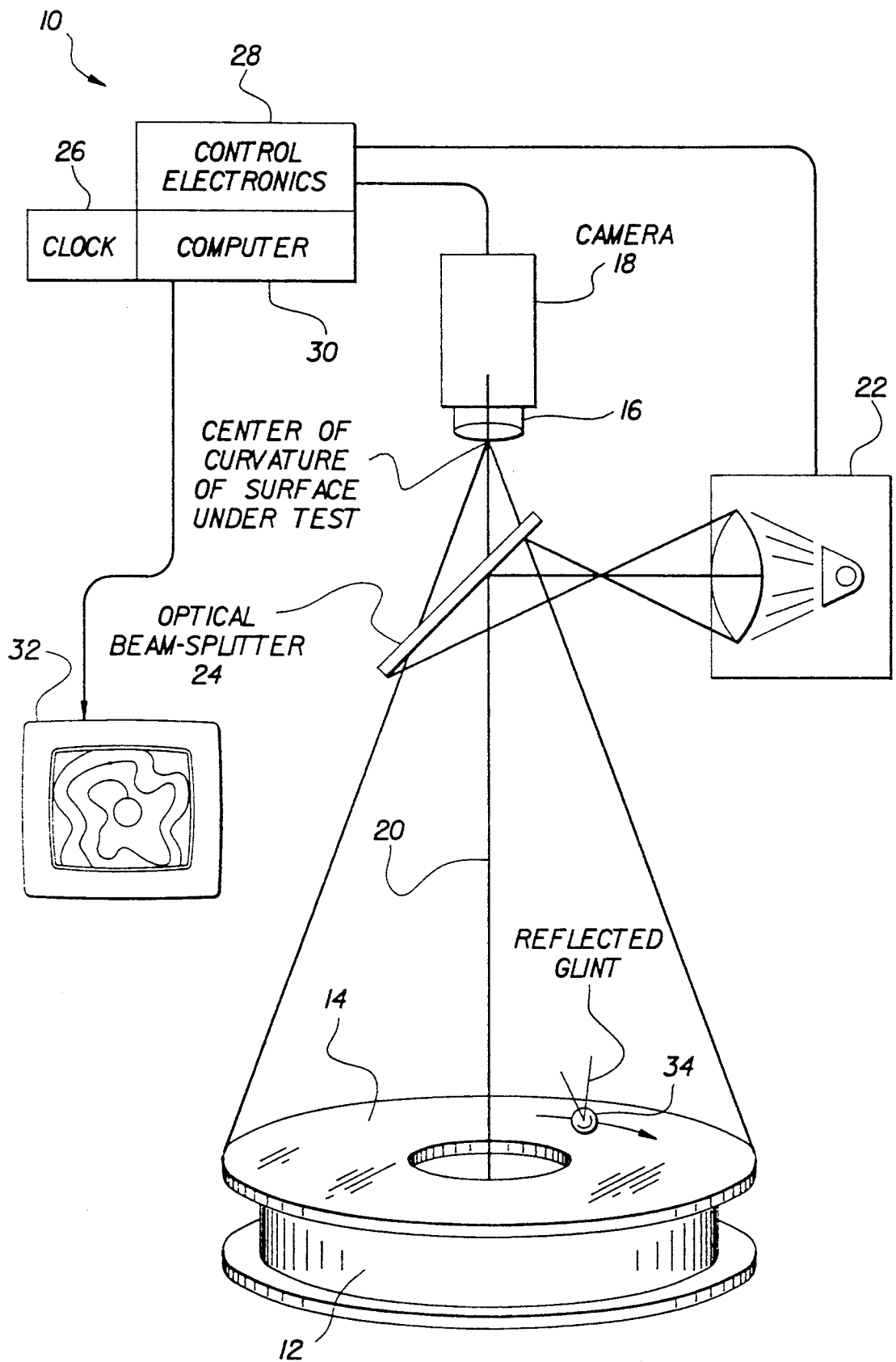
FIG. 1 shows a novel testing assembly that may be used to realize a novel method of the present invention.

Attention is now directed to FIG. 1, which shows a preferred testing assembly 10 that may be employed to realize the novel method of the present invention (explained hereinafter).

The FIG. 1 testing assembly 10 includes a workpiece 12 comprising a (nominally) axially symmetric concave mirror surface 14, of whose surface topology it is an object of the novel method to ascertain.

Note that, while the method is universal to all axially symmetric concave mirrors, it is not limited to such workpieces, and may include workpieces comprising an exceptional range of optical devices, having concave or convex surfaces, like lens surfaces, the optical devices having any reasonable arbitrary shape that defines a continuously differentiable geometry, for example, a flat or planar manifold, or a paraboloidal or hyperboloidal geometry.

Note further, that the workpiece may comprise a wide variety of compositions, including, for example, metals, fused quartz, plastics or elastomeric materials.

In terms of dimensions, and for an illustrative case like the equation (1) paraboloid cited above, dimensions of the radii r, R include:

$$0.005 \text{ inch} < r < 500 \text{ feet}$$

$$0.01 \text{ inch} < |R| < \infty$$

The FIG. 1 workpiece 12 is preferably supported so that the mirror surface 14 faces upward, with its axis of symmetry nominally plumb to gravity, and so that the mirror surface 14 may be exposed to an input lens 16 of a camera 18.

The camera 18 preferably comprises a four megapixel CCD array that is preferably located along an axis 20 of the mirror surface 14. The camera input lens 16 is preferably located at a nominal surface center of curvature. This positioning is preferred, because method accuracy may be enhanced when the camera 18 view angle is everywhere normal and equidistant from the surface 14 being characterized.

The camera 18 may be employed for the following reasons. As summarized above, the method of the present invention can ascertain the workpiece surface topology 14 by sensing a relative movement of a projectile with respect to the workpiece surface, and generating a locus of positional points over time of the projectile's such trajectory, as a measure of the surface topology.

To this end, the camera 18 preferably cooperates with a conventional strobe lamp 22, e.g., a flashtube or a shuttered laser beam, by way of an optical beamsplitter 24 action, for illuminating, sensing and recording an (x, y) positioning of a projectile with respect to the workpiece surface 14, as a function of time, thus generating the specified locus of positional points.

In particular, the accuracy of this characterization of the surface topology is dependent upon the accuracy of measurement of both projectile timing and positioning, for a large number of points on its trajectory.

As to the projectile timing, this capability may be temporarily maximized by triggering a short strobe pulse at a sequence of very accurately known times—$t_0$, $t_1$, $t_2$—preferably by way of a FIG. 1 crystal controlled clock 26-control electronics 28 setup. For example, flashes of duration 0.00001 second may be executed, with the spacings uniformly adjusted to allow a projectile to move more than one projectile diameter, between flashes. An observer, accordingly, would see a series of "frozen in time" projectile images.

As to the projectile positioning, this capability may be spatially maximized in two ways: (1) as already noted, and especially for a concave aspheric surface which is axially symmetric, the camera 18 is preferably positioned in the vicinity of the surface 14 center of curvature; (2) the camera 18 preferably comprises a CCD high density camera that can provide very accurate (high resolution) detection of a projectile position, for each strobe flash. A preferred camera 18 is Eastman Kodak Company Model KAF-4200 comprising a 4 megapixel array.

Note in this connection, that a preferred positioning of the optical beamsplitter 24 places a virtual image of the strobe flash, at the camera lens 16. In this way, an image of a projectile experiences no paralax effects between a strobe "glint" (i.e., illuminated specular region of a projectile), and a projectile centroid of contact with the workpiece surface. This action helps realize spatial accuracy.

FIG. 1 also shows a computer 30 that may be conventionally programmed an appendix containing an illustrative program listing is located in the patent file for synchronizing a camera 18 frame rate and read out for correspondence with the strobe flasher 22, and for analyzing the spatial and temporal information that uniquely characterizes the workpiece surface topology 14, as shown on a monitor 32.

A projectile 34 that is to be employed in the FIG. 1 testing assembly 10 may comprise a precision rolling ball. In alternative modes, the rolling ball can be hollow (large size, low mass, high moment of inertia), or homogeneous and solid, or can have the weight concentrated at the center (low moment of inertia). The rolling ball can be small or large: small balls are relatively more sensitive to local (high spatial) frequency topological factors; larger balls are relatively less sensitized to local features, including dust motes and pits.

The projectile 34 may also comprise a non-contact puck which preferably couples to a workpiece surface by way of a supporting thin film of air, or other gas between the puck and the workpiece.

Relative to a rolling ball, a non-contact puck can act as follows.

First, since a puck does not physically contact a surface of a workpiece, it can obviate the high spatial frequency errors incurred by a rolling ball due to e.g., surface roughness or dust on a surface.

Second, a puck following a surface acts as a low frequency spatial filter. That is, since an average gap between a puck and a workpiece is constant, a puck does not respond to surface features which are substantially smaller than a puck "footprint." Note that this can be either an advantage or disadvantage, depending on the condition of a workpiece and the goal of a measurement. This effect can, however, be controlled to some extend by the design of a puck, in particular, a size and shape of an interface (air film) surface between a puck and a workpiece.

Third, since a puck does not physically contact a workpiece, a risk of damage to a workpiece may be reduced. This is an important consideration for a workpiece comprising an optical coating or having a soft surface.

Fourth, a puck has an advantage over a rolling ball, since angular momentum is not a consideration and analysis may be easier.

Note, finally, with respect to a projectile 34 comprising either a rolling ball or a non-contact puck, the FIG. 1 testing assembly 10 is preferably located in a vacuum, so that air resistance on a projectile 34 may be eliminated.

Novel Method

A preferred testing assembly 10 has now been disclosed, and attention is directed to preferred aspects of the novel method of the present invention which may be realized by way of the testing assembly 10.

Figure 2:
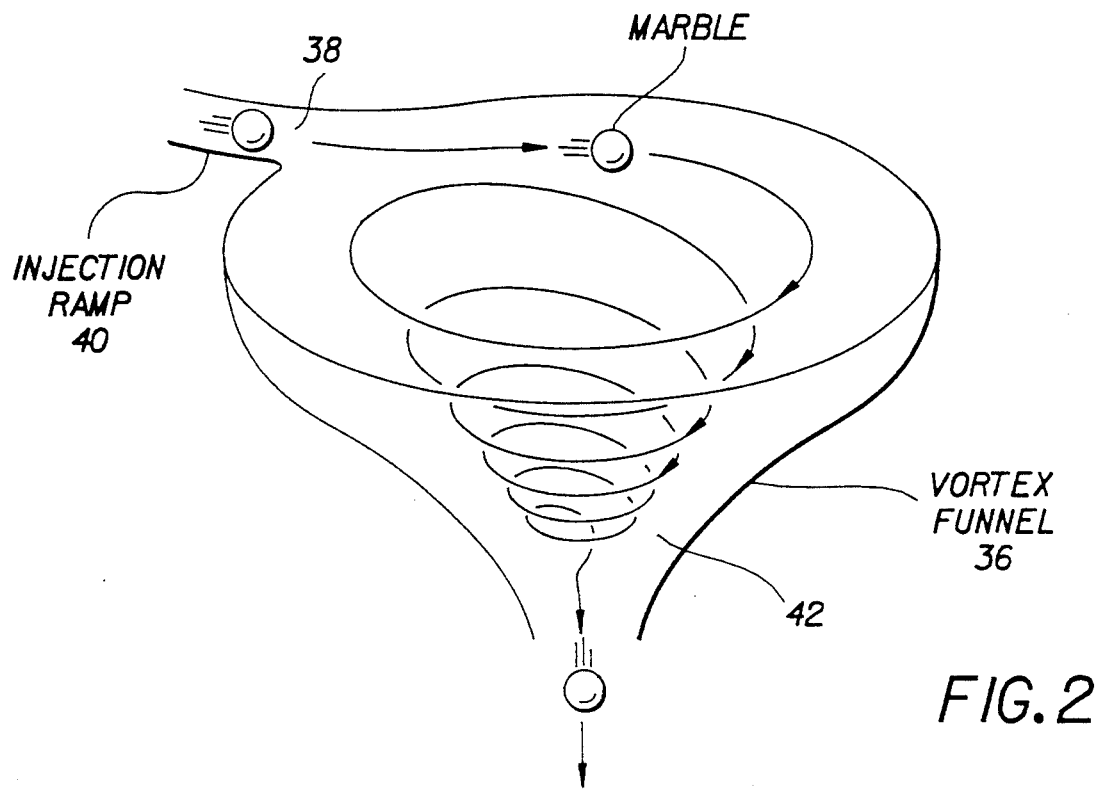
FIG. 2 shows a projectile/vortex funnel schematic that has analogies to an explanation of the method of the present invention.
Figure 3:
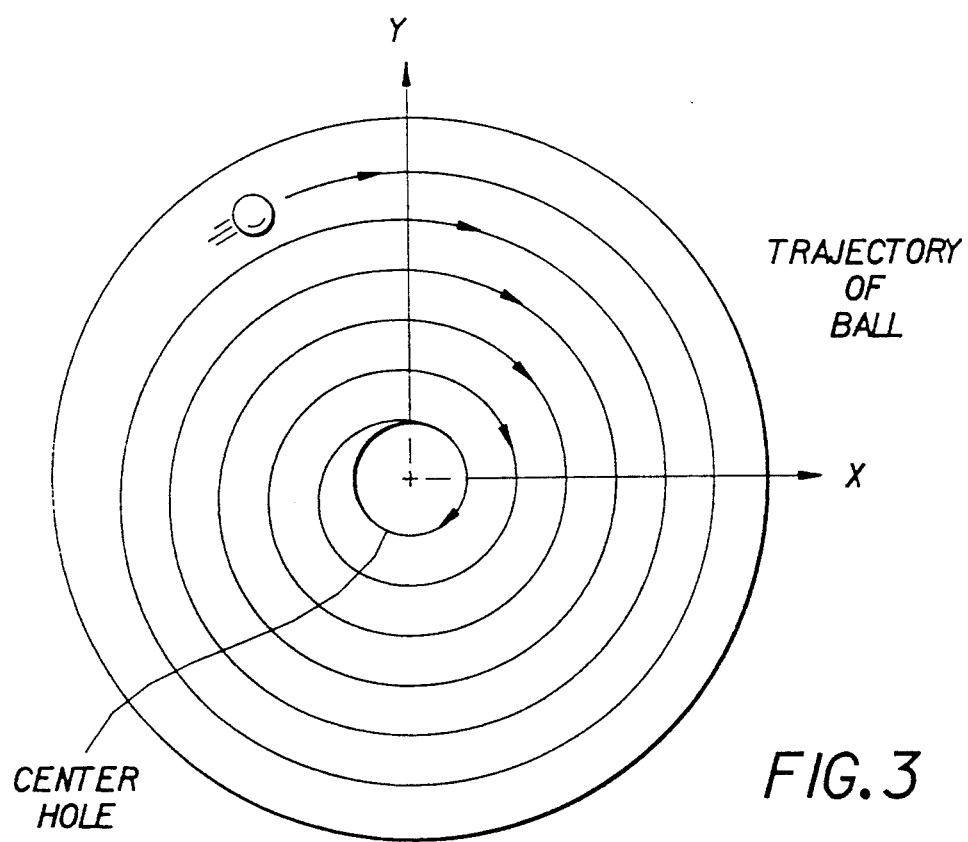
FIG. 3 shows a locus of positional points over time generated by a projectile in accordance with the present method.

Preliminarily, attention is directed to FIGS. 2 and 3, in order to provide background information for the utility of the method. FIG. 2 shows a vortex-shaped funnel 36 that can simulate a workpiece surface. A projectile 38, preferably injected tangentially from an injection ramp 40 into the vortex 36, rolls around the surface, gradually spiralling in and disappearing down a central orifice 42. This action, viewed from the vantage of FIG. 3, shows that the projectile 38 maps out a locus of (least action) positional points (x,y) as a function of time. A deterministic computation of this locus can be a measure of the sought for surface topology. Preferred deterministic computations may be provided by computing a Hamiltonian or Lagrangian computation of the locus.

We now turn our attention to details on the two method steps.

Step 1: Coupling a projectile to a surface of a workpiece and imparting a trajectory to the projectile with respect to the workpiece.

Figure 4:
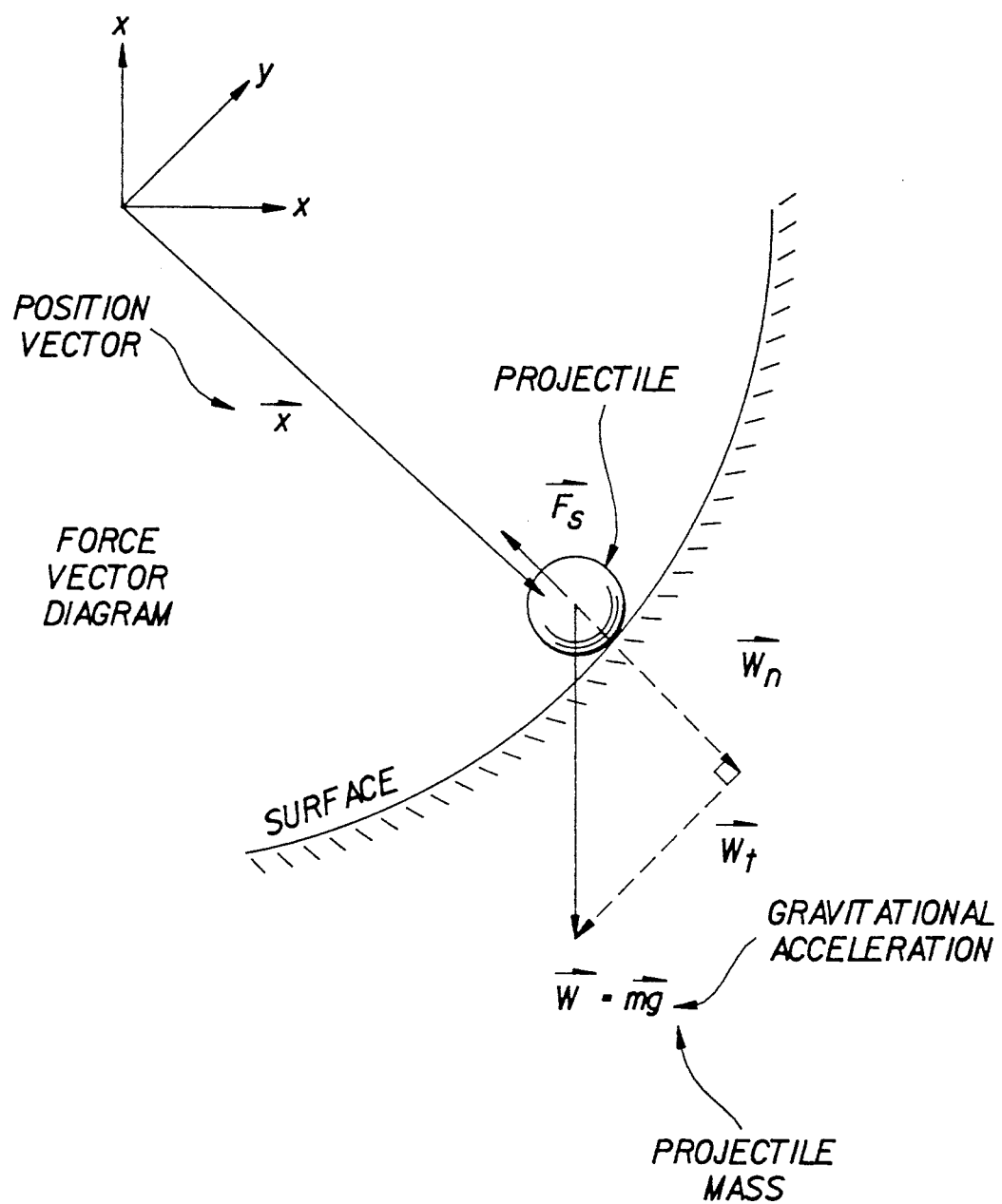
FIG. 4 shows a force vector diagram as an illustration of one step of the present method.

With reference to FIG. 4, a projectile preferably is coupled to a surface, when a surface normal component of a vector sum of the projectile's weight ($\vec{W}$) and the force of the surface on the projectile ($\vec{F}_s$), is directed into the surface.

Slip, Stick and Damping Consideration

Slip vs. Stick

If a projectile comprises a rolling ball, it is important that it not slip relative to a surface. That is, the (instantaneous) point of contact, the velocity of the contacting point on the ball relative to the contacting point on the surface, is everywhere and always zero. We call this condition a "sticking ball," to contrast it with a "slipping ball" where relative velocity is not zero. The reason for this constraint is that a slipping ball experiences chaotic vibration, which does not lend itself to utilitarian analysis. (The trajectory of the ball becomes indeterminant.)

Damping

A projectile experiences gradual energy loss due to friction between it and a surface. This is desirable because it allows the projectile to "paint out" a gradually decaying trajectory which may substantially fill the surface being characterized with a dense mapping of data points, thus facilitating a complete mapping of the surface topology. If the projectile moves through a fluid (e.g., air), it will also lose energy to the air. It is therefore important that the air be steady (motionless, calm) or even more preferably, that the characterization be performed in a vacuum environment, where air resistance is not a consideration.

Step 2: Sensing the trajectory of the projectile with respect to the workpiece surface, for assessing a locus of positional points over time of the projectile, the locus being a measure of the surface topology of the workpiece.

Calculation of surface error may be provided by the computer 30, preferably programmed in accordance with the following guidelines.

A. Collect data from test: each data point is x,y, and time.
B. Calculate the projectile acceleration at each point on the workpiece.
C. Calculate slope (x and y slope) at each point on the workpiece.
D. From these slope data, calculate (by integration) the z position of each of these points, thereby computing the measured workpiece topology.

This can be done as follows:
1. Start with slope data (each data point consists of x location, y location, x slope, and y slope).
2. Using x slope data for each point, calculate a best fit function (of slope data) over the workpiece. (The value of the function at each point represents the x slope at that point.) Repeat for y slope. These two functions can, for example, be polynomials of x and y.
3. Select a uniform grid size and create an xy grid of points on the work surface. These points will not, in general, match the xy locations of the slope data points. The grid selected can be finer or coarser than the slope data points.
4. For each point in the uniform grid, calculate the x slope and the y slope using the equations of the functions of slope data calculated in step 2. We now have a set of uniformly spaced point over the workpiece, with an x slope and y slope value for each of these points.
5. Starting at a central uniform grid point on the work surface, assign an arbitrary z value to that point, and proceed to integrate in the positive and negative x directions from that point using the trapezoidal integration method. This integration of x slopes results in the calculation of a z value (or height of the surface) for each point on this line.
6. Starting from each point on the line calculated in step 5, integrate similarly in the positive and negative y directions, calculating a z value for each of these new points. This calculation uses y slope data for each point. We now have calculated a z value for each uniformly spaced point on the work surface.

Figure 5:
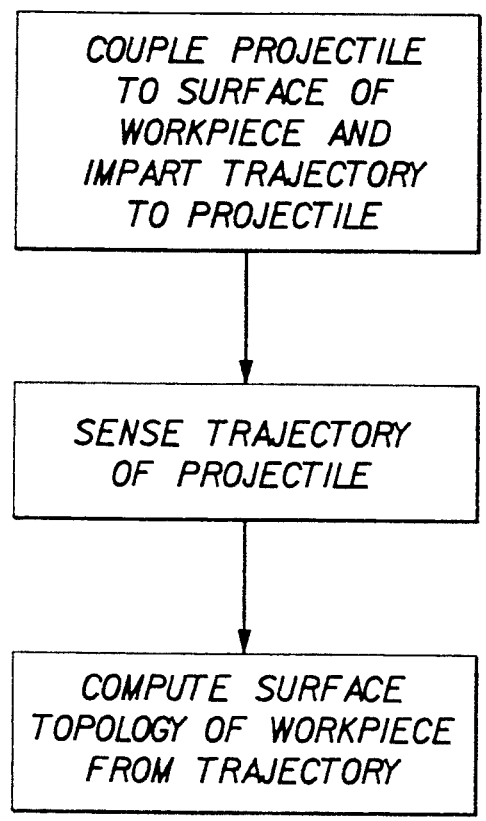
FIG. 5 shows a flow chart of the method according to the present invention.

E. Construct a smooth curve through these points and compare this curve to the desired workpiece shape (for example, a paraboloid). FIG. 5 is a flow chart generally showing the steps of the method of the present invention.

What is claimed is:

1. A method suitable for determining a surface topology of a workpiece, comprising the steps of:
   (1) coupling a projectile to a surface of a workpiece, and imparting a trajectory to the projectile with respect to the surface;
   (2) sensing the trajectory of the projectile with respect to the workpiece surface, for assessing a locus of positional points over time of the projectile, the locus being a measure of the surface topology of the workpiece; and
   (3) computing from said locus of positional points over time, the surface topology of said workpiece.

2. A method according to claim 1, wherein step (1) comprises creating a condition such that a surface normal component of a vector sum of the projectile weight and the force of the surface on the projectile, is directed into the surface.

3. A method according to claim 1, wherein step (2) comprises strobing the projectile and detecting its positioning with a CCD high density megapixel array.

* * * * *